United States Patent [19]

Bennett et al.

[11] Patent Number: 5,257,300
[45] Date of Patent: Oct. 26, 1993

[54] DIGITAL ANTI-SLOSH SYSTEM

[75] Inventors: Robert M. Bennett, Monument, Colo.; James T. Beaudry, Plymouth, Mich.

[73] Assignee: Ford Motor Company, Dearborn, Mich.

[21] Appl. No.: 812,558

[22] Filed: Dec. 23, 1991

[51] Int. Cl.[5] .................. G01F 23/36; G06M 3/02
[52] U.S. Cl. ........................... 377/21; 377/45; 73/313; 73/430; 340/618
[58] Field of Search ............ 377/21, 45; 340/618; 73/313, 430; 307/152

[56] References Cited

U.S. PATENT DOCUMENTS

| | | | |
|---|---|---|---|
| 3,818,760 | 6/1974 | Howard et al. | 377/21 |
| 3,927,305 | 12/1975 | Gruhl | 377/21 |
| 3,938,117 | 2/1976 | Bozoian | 340/244 R |
| 3,983,549 | 9/1976 | Akita et al. | 340/618 |
| 4,418,340 | 11/1983 | Maeshiba | 340/618 |
| 4,497,205 | 2/1985 | Zulauf et al. | 73/313 |
| 4,509,044 | 4/1985 | Yachida | 377/45 |
| 4,513,277 | 4/1985 | Moore et al. | 340/59 |
| 4,635,043 | 1/1987 | Kronenberg et al. | 340/618 |
| 4,760,736 | 8/1988 | Huynh | 73/430 |
| 4,838,082 | 6/1989 | McCoy et al. | 73/313 |
| 4,991,435 | 2/1991 | Colarossi | 73/313 |

FOREIGN PATENT DOCUMENTS

| | | |
|---|---|---|
| 0066782 | 9/1975 | Australia ................ 73/304 R |
| 2849066 | 5/1980 | Fed. Rep. of Germany . |
| 3444138 | 6/1986 | Fed. Rep. of Germany . |

*Primary Examiner*—John S. Heyman
*Attorney, Agent, or Firm*—Mark Mollon; Roger L. May

[57] ABSTRACT

The input voltage from a fuel tank level sender is processed by an anti-slosh circuit which has a short time constant during a fast acquire operation and a longer time constant during normal operation. The slew rate of the output voltage provided to a gauge is determined by the clock rate of an up/down counter which is determined by switched resistances and a small valued capacitor. Either analog or digital anti-slosh outputs are provided.

17 Claims, 2 Drawing Sheets

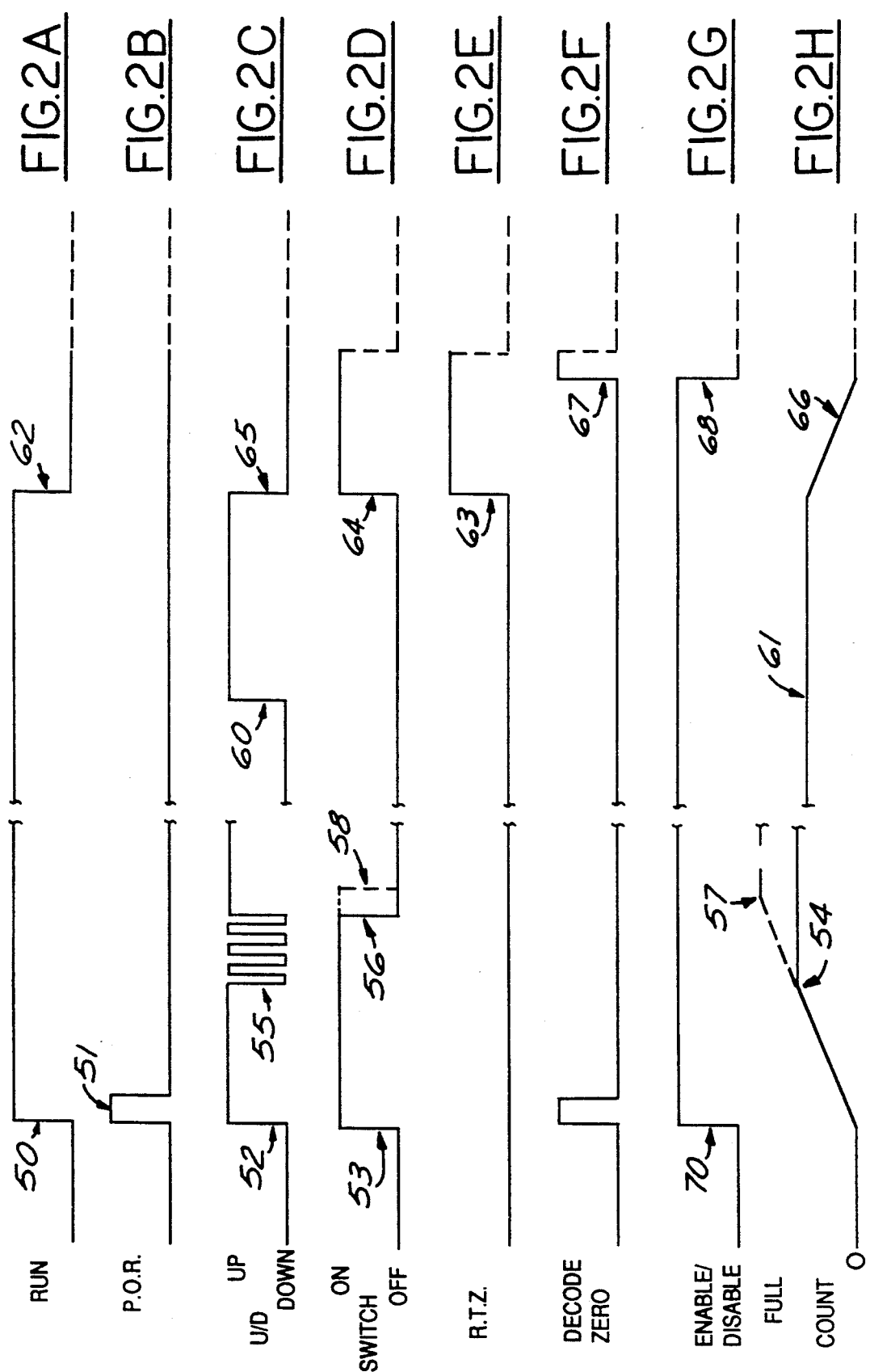

DIGITAL ANTI-SLOSH SYSTEM

BACKGROUND OF THE INVENTION

The present invention relates in general to a liquid level indicating system and more specifically to an anti-slosh circuit switchable between a short time constant and a long time constant without requiring the use of a large capacitor. The invention is particularly applicable to measuring the fuel level in a motor vehicle fuel tank and accordingly will be described with reference to such a system.

A basic fuel gauge system includes a liquid level sensor in a fuel tank and a gauge receiving a sensor signal to indicate to the driver the status of the sensor unit and, therefore, the fuel level. A typical sensor may include a float body pivoting on a float arm connected to a variable resistance which generates a voltage signal proportional to the level of the float. However, fuel level variations due to movement of the vehicle (known as "fuel slosh") cause the sensor signal to include transient errors with respect to the actual level fuel in the tank. Since these transient errors have an average value of zero, the actual fuel level can still be determined by obtaining the average of the sensor signal over a sufficiently long time period. Accordingly, a variety of damping arrangements have been incorporated into gauge systems to eliminate rapid transient movements of the fuel gauge due to fuel slosh.

Electronically damped anti-slosh circuits frequently employ RC integrator circuits to derive an average signal. It is also known to limit the slew rate of a signal amplifier to slow the response of an anti-slosh circuit in order to damp the system response to changes in the sensor signal. In order to obtain the long time constants which are required in anti-slosh circuits, the prior art has used undesirably large capacitors, such as electrolytics, which are expensive and create packaging problems. Leakage currents associated with the large capacitors also create disadvantages such as inaccuracy or nonsymmetrical operation as the level signal slews up or down.

SUMMARY OF THE INVENTION

Accordingly, it is a principal object of the present invention to provide an anti-slosh circuit for a liquid level sensing system which obtains a slow slew rate without requiring a large capacitor.

It is a further object of the invention to provide an anti-slosh circuit which is inexpensive to produce and install in a vehicle.

It is another object of the invention to provide an anti-slosh circuit having a selectable slew rate so that an initial value may be obtained in a fast acquire operation and a slower slew rate can be selected during normal operation.

These and other objects are achieved in a digital anti-slosh circuit having a comparator receiving a liquid level signal at one comparator input. An up/down counter is provided for counting a clock signal and for providing a count which is provided to a digital-to-analog converter. The output of the digital-to-analog converter representing the count in the up/down counter is provided to the remaining input of the comparator. The comparator output is a binary signal which controls the up or down counting direction of the up/down counter. Thus, the counter output tends toward the liquid level signal and once the proper level is acquired, the up/down counter switches between values one above and one below the correct liquid level signal value. The clock signal provided to the up/down counter is generated at a high frequency in a fast acquire mode and at a low frequency in a normal mode to reduce the slew rate of the anti-slosh circuit. The clock signal is generated using an oscillator having a single capacitor with a small capacitance.

BRIEF DESCRIPTION OF THE DRAWINGS

The novel features of the invention are set forth with particularity in the appended claims. The invention itself, however, both as to its organization and method of operation together with further objects and advantages thereof, may best be understood by reference to the following description taken in conjunction with the accompanying drawings in which:

FIG. 2 shows various signals present during the operation of the circuit of FIG. 1.

DETAILED DESCRIPTION OF PREFERRED EMBODIMENTS

Figure 1:
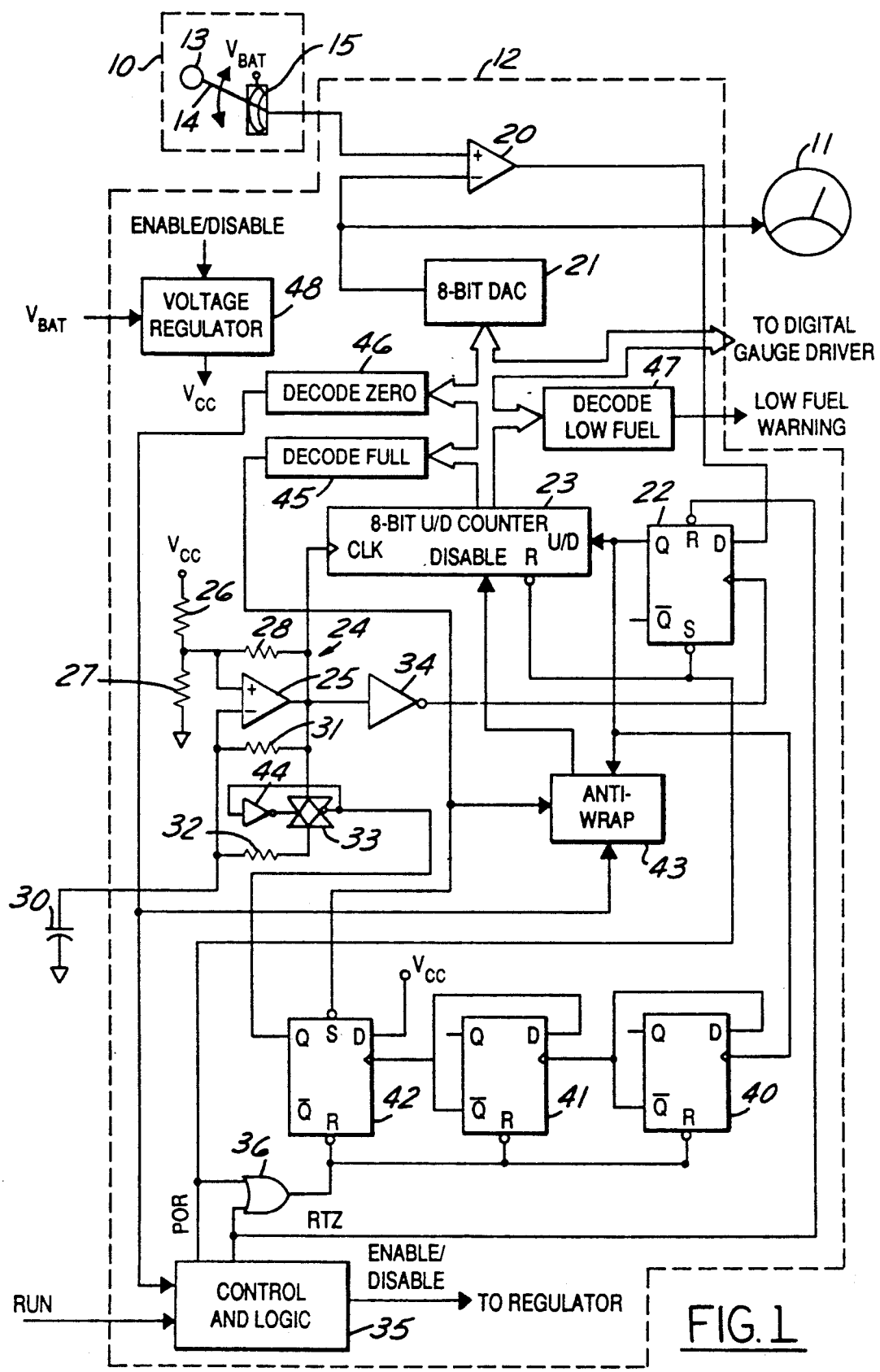
FIG. 1 is a schematic diagram of the anti-slosh circuit of the present invention.

FIG. 1 shows a fuel level sender 10 coupled to a fuel gauge 11 through an anti-slosh circuit 12 which is preferably comprised of an integrated circuit. Fuel sender 10 includes a float 13 for floating at the surface of the fuel in a tank. A pivot arm 14 is connected to float 13 at one end and is connected to a variable resistor 15 at its other end. Variable resistor 15 is connected to battery voltage $V_{BAT}$ and generates a liquid level signal having a voltage proportional to the position of float 13.

The fuel sender output signal is coupled to the noninverting input of a comparator 20 in anti-slosh circuit 12. The inverting input of comparator 20 is connected to the output of a digital-to-analog converter (DAC) 21. The output of DAC 21 is also connected to the signal input of fuel gauge 11.

The output of comparator 20 is connected to the D input of a latch 22 comprised of a D-type flip-flop. The Q output from latch 22 is connected to the up/down control input of an eight-bit up/down counter 23. A clock input CLK on counter 23 receives a CLK signal from an oscillator 24. Thus, the loop comprising comparator 20, counter 23, and DAC 21 generates a voltage from DAC 21 which is approximately equal to the sender output signal from fuel sender 10. For example, if the sender signal to comparator 20 is higher than the output voltage from DAC 21, then the comparator output signal selects the up counting direction through latch 22. When counter 23 receives the next CLK signal, it increases its output by one count (thereby increasing the output voltage from DAC 21). The count in counter 23 and the output voltage from DAC 21 increase at succeeding CLK signals until the output voltage from DAC 21 exceeds the sender signal, which causes the comparator output signal to go low. The down counting direction is then selected through latch 22. At the next CLK signal, counter 23 counts down and the output voltage from DAC 21 is lowered. Thus, the output of DAC 21 oscillates above and below the sender signal by one count. However, when the sender signal changes, the output from DAC 21 tends to follow the change.

In the present invention, the clocking rate of counter 23 is high during a fast acquire operation to initialize the correct level output and is then reduced during normal operation to obtain a long time constant (i.e., slow slew rate) to minimize response to fuel slosh. In the preferred embodiment illustrated in FIG. 1, the invention employs a variable oscillator 24 in the form of a relaxation oscillator to generate the CLK signal. A comparator 25 has a noninverting input connected to the junction of series connected resistors 26 and 27 which are connected between a supply voltage $V_{cc}$ and ground. A resistor 28 is connected between the inverting input and the output of comparator 25. Resistors 26, 27, and 28 preferably have equal resistances.

Oscillation of relaxation oscillator 24 is determined by an RC network comprising a capacitor 30 connected between the inverting input of comparator 25 and ground and resistors 31 and 32 connected between the inverting input and the output of comparator 25. A switch 33 is connected in series with resistor 32 so that the negative feedback resistance of comparator 25 can be switched between a low resistance and a high resistance, thereby providing a selectable oscillation frequency.

Resistor 32 has a low resistance as compared to the resistance of resistor 31. Capacitor 30 is external to integrated circuit 12 and has a relatively small capacitance. For example, resistor 31 may have a resistance of about 50 KΩ while resistor 32 has a resistance of about 1 KΩ and capacitor 30 has a capacitance of about 3 μF. When switch 33 is turned on, a CLK signal having a period of about 4 milliseconds is obtained. When switch 33 is turned off, a slower CLK signal having a period of about 2 seconds is obtained.

The CLK signal output from comparator 25 is provided to the CLK input of counter 23 and to the input of an inverter 34. The output of inverter 34 is connected to the CLK input of latch 22 so that the proper up-/down counting direction of counter 23 is latched prior to each counting cycle of counter 23.

Switch 33 preferably is comprised of back-to-back transistors, such as an N-channel JFET connected in parallel with a P-channel JFET. Switch 33 is controlled according to a fast acquire operational mode and a normal operational mode as is described below.

Anti-slosh circuit 12 includes a control and logic circuit 35 which receives a RUN signal from a vehicle ignition indicating when the ignition key is in the RUN position. Control and logic circuit 35 generates a power-on reset (POR) signal pulse which is generated when the RUN signal first occurs. The POR pulse is provided to a reset input on counter 23, a SET input on latch 22, and to one input of an OR gate 36. The output of OR gate 36 is connected to reset inputs of three flip-flops 40, 41, and 42 connected as a 2-bit ripple counter with overflow. Flip-flop 40 has a CLK input connected to the Q output of latch 22. The NOT Q output of flip-flop 40 is connected to the CLK input of flip-flop 41 and to the D input of flip-flop 40. Likewise, flip-flop 41 has its NOT Q output connected to the CLK input of fliP-flop 42 and to the D input of flip-flop 41. Flip-flop 42 has its D input connected to supply voltage $V_{cc}$. The Q output of flip-flop 42 is connected to one input of switch 33 and is coupled to the other input of switch 33 through an inverter 44.

A decode FULL circuit 45 has its input connected to the output of up/down counter 23 and generates an output signal when counter 23 is at its maximum count. This output is provided to an anti-wrap circuit 43 and to the SET input of flip-flop 42. A decode ZERO circuit 46 also has its input connected to the output of counter 23 and provides an output signal to control and logic circuit 35 and to anti-wrap circuit 43 whenever counter 23 is at a zero count. Anti-wrap circuit 43 has another input connected to the Q output of latch 22 and has an output connected to a disable input of counter 23.

The output of counter 23 is connected to a decode LOW FUEL circuit 47 which provides a low fuel warning signal which may be employed to provide a special low fuel indication to the driver of a vehicle whenever a certain number of high order bits in the count are zero. The output of counter 23 may also be directly connected to a digital gauge driver if a digital gauge is used rather than analog gauge 11.

A voltage regulator 48 is provided which receives battery voltage $V_{BAT}$ and generates supply voltage $V_{cc}$ which is coupled to each of the respective circuits in integrated circuit 12. Control and logic circuit 35 provides an enable/disable control signal to voltage regulator 48 so that the anti-slosh circuit can be deactivated when the vehicle is not in use.

The detailed operation of anti-slosh circuit 12 will be explained with reference to waveform diagrams in FIGS. 2A through 2H. When a vehicle is started and the ignition is set to the run position, the RUN signal provided to control and logic circuit 35 rises to a high logic level as shown at 50 in FIG. 2A. Control and logic circuit 35 then generates a POR pulse 51 as shown in FIG. 2B. The POR pulse resets counter 23 to a zero count and sets latch 22 so that counter 23 is set to an upward counting direction 52 in FIG. 2C.

POR pulse 51 also resets flip-flops 40, 41, and 42 through OR gate 36. Therefore, the Q output of flip-flop 42 is initialized at a low logic level thereby turning on switch 33. This causes relaxation oscillator 24 to operate with a short period (i.e., high frequency) so that the count in counter 23 rapidly converges to the actual fuel level indicated by the sender signal. As shown in FIG. 2D, the switch is turned on at 53 causing fast-acquire operation to occur. As shown in FIG. 2H, the count in counter 23 rises from zero until the sensed fuel level is acquired at 54.

When the correct count is obtained, the counting direction will begin to oscillate up and down as shown at 55 in FIG. 2C. The transitions in the up/down counting direction are counted by flip-flops 40, 41, and 42 until the state of flip-flop 42 changes after the fourth such transition. The switching of flip-flop 42 causes switch 33 to be turned off as shown at 56 in FIG. 2D and normal operation begins with a slower clock rate.

During the fast acquire mode, if the count reaches a value indicating a full tank as shown at 57 in FIG. 2H, flip-flop 42 is set by decode FULL circuit 45. Then switch 33 turns off so that the slow or normal operation of the relaxation oscillator is initiated at 58 in FIG. 2D. Thus, the delay provided for the fast acquire ends when the FULL count is reached without regard for the number of transitions of the up/down counting direction.

After switch 33 is turned off and the anti-slosh circuit begins normal operation, the output of counter 23 tends to follow the average value of the sender signal. The CLK signal provided to counter 23 preferably has a period of about two seconds corresponding to a maximum slew rate in the output to gauge 11 of about 10 to 20 millivolts per second when the gauge has an output voltage range of about 5 volts. The up/down counting direction will change periodically during normal operation as shown at 60 in FIG. 2C. However, the actual count contained in counter 23 varies only slowly as shown at 61 in FIG. 2H.

A further aspect of the invention is directed to preventing overflow and underflow of counter 23. For example, if the sender signal is greater than the maximum output voltage from DAC 21, counter 23 might attempt to count up, resulting in an overflow or wrap-around to zero. On the other hand, when the sender signal is less than the minimum voltage which can be output by DAC 21, counter 23 might attempt to count down, resulting in an underflow or wrap-around to full. To prevent wrapping around, anti-wrap circuit 43 disables counter 23 whenever either i) the decode FULL signal is high and the counting direction is up, or ii) the decode ZERO signal is high and the counting direction is down.

When the vehicle is turned off, it is desirable to return the fuel gauge reading to zero. However, certain types of air core gauges will remain fixed at their last indication when power is turned off. When the angle of gauge sweep between empty and full is less than 180°, the gauge can be returned to zero by resetting counter 23 to zero and then disabling the regulator after a settling time. For gauges with larger sweep angles, the invention uses a return-to-zero (RTZ) signal as shown in FIG. 2E. When the RUN signal switches to a low logic level as shown at 62 in FIG. 2A, the RTZ signal rises to a high logic level as shown at 63 in FIG. 2E. The RTZ signal resets flip-flop 42 thereby causing switch 33 to close and relaxation oscillator 24 to generate a fast CLK signal as shown at 64 in FIG. 2D. The RTZ signal likewise resets latch 22 so that the down counting direction is determined for counter 23 as shown at 65 in FIG. 2C. The count in counter 23 quickly decrements to zero as shown at 66 in FIG. 2H. When the count reaches zero, the output from decode ZERO circuit 46 rises to a high logic level as shown at 67 in FIG. 2F. In response to the count reaching zero, the enable/disable command signal from control and logic circuit 35 switches to a low logic level as shown at 68 thereby disabling the counting circuits and maintaining the count at zero. Control and logic circuit 35 preferably has a separate, nondisabled power input so that the enable/disable command signal can be regenerated to reactivate the anti-slosh circuit upon the next occurrence of the RUN signal as shown at 70.

As shown by the description above, the anti-slosh circuit of the present invention operates according to a method wherein the count stored in the up/down counter is converted to an analog voltage substantially within the voltage range of the fuel sender. The analog voltage is compared to the sender signal, and a comparison signal is provided which indicates the greater of the sender signal or the analog voltage. Either an up or a down counting direction is periodically determined for the count stored in the up/down counter in response to the comparison signal. Counting is performed in the periodically determined direction at a first selectable rate during a fast acquire operation. Counting is performed in the periodically determined direction at a second selectable rate slower than the first selectable rate during normal operation. Fast acquire operation occurs when level indication is first initiated. Normal operation subsequently begins either: a) after a predetermined number of transitions in the comparison or b) the count reaches a predetermined FULL count. The selectable rates are obtained using a relaxation oscillator having a variable feedback resistance. The relaxation oscillator allows use of a small capacitor which avoids the drawbacks of a large capacitor described above. Although an analog relaxation oscillator has been shown, the selectable frequencies could also be provided through digital means, such as a digital clock divider as is known in the art.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. An anti-slosh circuit for a liquid level signal from a liquid level sensor in a vehicle, said liquid level signal having a voltage varying within a first range of voltages according to a sensed liquid level, said circuit comprising:
   a voltage comparator for receiving said liquid level signal at one comparator input and for providing a bistable comparator output signal;
   up/down counter means for counting a clock signal to provide a count, said up/down counter means being coupled to said voltage comparator and being responsive to said comparator output signal to determine an up or down counting direction;
   digital-to-analog converter means coupled to said up/down counter means for converting said count to an analog voltage substantially within said first range, said analog voltage being coupled to the other comparator input;
   clock means coupled to said up/down counter means for generating said clock signal at a selectable frequency in response to a selection signal; and
   delay means coupled to said clock means for generating said selection signal to a) select a first selectable frequency for said clock signal when said anti-slosh circuit is first activated and for a predetermined delay thereafter, and b) select a second selectable frequency lower than said first selectable frequency after said predetermined delay, said delay means including a delay counter for counting transitions of said counting direction and wherein said predetermined delay ends when said delay counter reaches a predetermined count.

2. The circuit of claim 1 further comprising reset means for resetting said delay counter and said up/down counter means when said anti-slosh circuit is activated.

3. The circuit of claim 1 further comprising:
   a latch coupling said comparator output signal to said up/down counter means, said latch being coupled to said clock means for operating said latch synchronously with said clock signal; and
   an inverter connected to said clock means and said latch for inverting said clock signal applied to said latch means.

4. The circuit of claim 3 further comprising reset means for resetting said up/down counter means and setting said latch when said anti-slosh circuit is activated.

5. The circuit of claim 1 wherein said clock means is comprised of a relaxation oscillator having a switchable resistance for selecting between said first and second selectable frequencies.

6. The circuit of claim 1 further comprising low level means coupled to said up/down counter means for indicating when said count is below a predetermined low level count.

7. The circuit of claim 1 further comprising full level means coupled to said up/down counter means and said delay means for selecting said second selectable frequency when said count equals a maximum count.

8. The circuit of claim 1 further comprising anti-wrap means for disabling said up/down counter means when either i) said count is at a maximum count and said counting direction is up, or ii) said count is at a zero count and said counting direction is down.

9. The circuit of claim 1 further comprising return-to-zero means for returning said count to zero when said anti-slosh circuit is deactivated.

10. A method for indicating liquid level in response to a liquid level signal from a liquid level sensor in a vehicle, said liquid level signal having a voltage varying within a first range of voltages according to a sensed liquid level, said method comprising the steps of:
 converting the count stored in an up/down counter to an analog voltage substantially within said first range;
 comparing said liquid level signal to said analog voltage and providing a comparison signal indicative of the greater of said liquid level signal and said analog voltage;
 periodically determining either an up or a down counting direction for said count stored in said up/down counter in response to said comparison signal;
 counting in the periodically determined direction at a first selectable rate during a fast acquire operation; and
 counting in the periodically determined direction at a second selectable rate slower than said first selectable rate during normal operation;
 wherein said fast acquire operation occurs when said method is initiated and said normal operation occurs either a) after a predetermined number of transitions in said comparison signal or b) said count reaches a predetermined full level count.

11. The method of claim 10 wherein said first and second selectable rates are determined by a relaxation oscillator, said method further comprising the step of:
 varying a feedback resistance in said relaxation oscillator in order to select said first or said second selectable rate.

12. An anti-slosh circuit for a liquid level signal from a liquid level sensor in a vehicle, said liquid level signal having a voltage varying within a first range of voltages according to a sensed liquid level, said circuit comprising:
 a voltage comparator for receiving said liquid level signal at one comparator input and for providing a bistable comparator output signal;
 up/down counter means for counting a clock signal to provide a count, said up/down counter means being coupled to said voltage comparator and being responsive to said comparator output signal to determine an up or down counting direction;
 digital-analog converter means coupled to said up/down counter means for converting said count to an analog voltage substantially within said first range, said analog voltage being coupled to the other comparator input;
 clock means coupled to said up/down counter means for generating said clock signal at a selectable frequency in response to a selection signal;
 delay means coupled to said clock means for generating said selection signal to a) select a first selectable frequency for said clock signal when said anti-slosh circuit is first activated and for a predetermined delay thereafter, and b) select a second selectable frequency lower than said first selectable frequency after said predetermined delay;
 a latch coupling said comparator output signal to said up/down counter means, said latch being coupled to said clock means for operating said latch synchronously with said clock signal; and
 an inverter connected to said clock means and said latch for inverting said clock signal applied to said latch means.

13. The circuit of claim 12 wherein said delay means includes a delay counter for counting transitions of said counting direction and wherein said predetermined delay ends when said delay counter reaches a predetermined count.

14. The circuit of claim 12 further comprising full level means coupled to said up/down counter means and said delay means for selecting said second selectable frequency when said count equals a maximum count.

15. The circuit of claim 12 further comprising anti-wrap means for disabling said up/down counter means when either i) said count is at a maximum count and said counting direction is up, or ii) said count is at a zero count and said counting direction is down.

16. The circuit of claim 12 further comprising return-to-zero means for returning said count to zero when said anti-slosh circuit is deactivated.

17. An anti-slosh circuit for a liquid level signal from a liquid level sensor in a vehicle, said liquid level signal having a voltage varying within a first range of voltages according to a sensed liquid level, said circuit comprising:
 a voltage comparator for receiving said liquid level signal at one comparator input and for providing a bistable comparator output signal;
 up/down counter means for counting a clock signal to provide a count, said up/down counter means being coupled to said voltage comparator and being responsive to said comparator output signal to determine an up or down counting direction;
 digital-to-analog converter means coupled to said up/down counter means for converting said count to an analog voltage substantially within said first range, said analog voltage being coupled to the other comparator input;
 clock means coupled to said up/down counter means for generating said clock signal at a selectable frequency in response to a selection signal;
 delay means coupled to said clock means for generating said selection signal to a) select a first selectable frequency for said clock signal when said anti-slosh circuit is first activated and for a predetermined delay thereafter, and b) select a second selectable frequency lower than said first selectable frequency after said predetermined delay; and
 anti-wrap means for disabling said up/down counter means when either i) said count is at a maximum count and said counting direction is up, or ii) said count is at a zero count and said counting direction is down.

* * * * *